US009037668B2

(12) United States Patent
Gartside et al.

(10) Patent No.: US 9,037,668 B2
(45) Date of Patent: *May 19, 2015

(54) ELECTRONIC MESSAGE MANAGER SYSTEM, METHOD, AND COMPUTER PROGRAM PRODUCT FOR SCANNING AN ELECTRONIC MESSAGE FOR UNWANTED CONTENT AND ASSOCIATED UNWANTED SITES

(71) Applicant: McAfee Inc., Santa Clara, CA (US)

(72) Inventors: Paul Nicholas Gartside, Newport Pangell (GB); George L. Heron, Forest Hill, MD (US); Christopher S. Bolin, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/083,546

(22) Filed: Nov. 19, 2013

(65) Prior Publication Data
US 2014/0096243 A1 Apr. 3, 2014

Related U.S. Application Data

(63) Continuation of application No. 11/742,423, filed on Apr. 30, 2007, now Pat. No. 8,601,067.

(51) Int. Cl.
*G06F 15/16* (2006.01)
*H04L 29/06* (2006.01)
*H04L 12/58* (2006.01)

(52) U.S. Cl.
CPC ......... *H04L 63/1408* (2013.01); *H04L 63/1425* (2013.01); *H04L 63/145* (2013.01); *H04L 51/12* (2013.01)

(58) Field of Classification Search
None
See application file for complete search history.

(56) References Cited

U.S. PATENT DOCUMENTS

| | | | |
|---|---|---|---|
| 5,987,610 A | 11/1999 | Franczek et al. | |
| 6,035,423 A | 3/2000 | Hodges et al. | |
| 6,073,142 A | 6/2000 | Geiger et al. | |
| 6,088,803 A | 7/2000 | Tso et al. | |
| 6,094,731 A | 7/2000 | Waldin et al. | |
| 6,233,618 B1 | 5/2001 | Shannon | |
| 6,460,050 B1 | 10/2002 | Pace et al. | |
| 6,654,751 B1 | 11/2003 | Schmugar et al. | |
| 6,785,732 B1 | 8/2004 | Bates et al. | |
| 6,789,201 B2 | 9/2004 | Barton et al. | |
| 6,802,012 B1 | 10/2004 | Smithson et al. | |
| 7,107,618 B1 | 9/2006 | Gordon et al. | |
| 7,506,155 B1 | 3/2009 | Stewart et al. | |
| 7,873,996 B1 | 1/2011 | Emigh et al. | |

(Continued)

OTHER PUBLICATIONS

Notice of Allowance in U.S. Appl. No. 13/469,003 mailed Apr. 8, 2014.

(Continued)

*Primary Examiner* — Afshawn Towfighi
(74) *Attorney, Agent, or Firm* — Patent Capital Group

(57) ABSTRACT

A system, method, and computer program product are provided for scanning an electronic message for unwanted content and associated unwanted sites in response to a request. In use, a request is received via a network to scan an electronic message prior to opening the electronic message, utilizing an electronic message manager. In addition, the electronic message is scanned for unwanted content and associated unwanted sites, in response to the request. Further, a response to the request is sent via the network.

25 Claims, 7 Drawing Sheets

(56) References Cited

U.S. PATENT DOCUMENTS

| | | | |
|---|---|---|---|
| 8,196,206 | B1 | 6/2012 | Gartside et al. |
| 8,601,067 | B2 | 12/2013 | Gartside et al. |
| 8,856,931 | B2 | 10/2014 | Gartside et al. |
| 8,918,864 | B2 | 12/2014 | Balasubramanian |
| 2002/0178381 | A1* | 11/2002 | Lee et al. ................ 713/201 |
| 2003/0023708 | A1 | 1/2003 | Jung |
| 2003/0097591 | A1 | 5/2003 | Pham et al. |
| 2003/0221129 | A1 | 11/2003 | Hejl |
| 2004/0064737 | A1 | 4/2004 | Milliken et al. |
| 2004/0111480 | A1 | 6/2004 | Yue |
| 2004/0117648 | A1 | 6/2004 | Kissel |
| 2004/0221014 | A1 | 11/2004 | Tomkow |
| 2005/0015626 | A1 | 1/2005 | Chasin |
| 2005/0131900 | A1 | 6/2005 | Palliyll et al. |
| 2005/0251500 | A1 | 11/2005 | Vahalia et al. |
| 2006/0047634 | A1 | 3/2006 | Aaron et al. |
| 2006/0074809 | A1 | 4/2006 | Meyer |
| 2006/0185017 | A1 | 8/2006 | Challener et al. |
| 2006/0248573 | A1* | 11/2006 | Pannu et al. ................ 726/1 |
| 2006/0253582 | A1 | 11/2006 | Dixon et al. |
| 2007/0011739 | A1 | 1/2007 | Zamir et al. |
| 2007/0100999 | A1 | 5/2007 | Haider |
| 2008/0208868 | A1 | 8/2008 | Hubbard |
| 2012/0151521 | A1 | 6/2012 | Gilley et al. |
| 2012/0227110 | A1 | 9/2012 | Gartside et al. |

OTHER PUBLICATIONS

Final Office Action in U.S. Appl. No. 11/758,494 mailed Mar. 14, 2014.
Notice of Allowance in U.S. Appl. No. 11/758,494 mailed Aug. 27, 2014.
Response to Non-Final Office Action dated May 12, 2009 in U.S. Appl. No. 11/742,423, filed Oct. 12, 2009.
Non-Final Office Action in U.S. Appl. No. 11/742,423 mailed on Jan. 21, 2010.
Response to Non-Final Office Action dated Jan. 21, 2010 in U.S. Appl. No. 11/742,423, filed Apr. 21, 2010.
Final Office Action in U.S. Appl. No. 11/742,423 mailed on Jul. 8, 2010.
Request for Continued Examination and Amendment in U.S. Appl. No. 11/742,423, filed Jan. 10, 2011.
Non-Final Office Action in U.S. Appl. No. 11/742,423 mailed on Sep. 8, 2011.
Response to Non-Final Office Action dated Sep. 08, 2011 in U.S. Appl. No. 11/742,423, filed Dec. 8, 2011.
Final Office Action in U.S. Appl. No. 11/742,423 mailed on Jan. 30, 2012.
Request for Continued Examination and Amendment in U.S. Appl. No. 11/742,423, filed on Apr. 4, 2012.
Non-Final Office Action in U.S. Appl. No. 11/742,423 mailed on Oct. 12, 2012.
Response to Non-Final Office Action dated Oct. 12, 2012 in U.S. Appl. No. 11/742,423, filed Jan. 14, 2013.
Final Office Action in U.S. Appl. No. 11/742,423 mailed on Apr. 4, 2013.
Response to Final Office Action dated Apr. 4, 2013 in U.S. Appl. No. 11/742,423, filed Jun. 4, 2013.
Advisory Action dated Jun. 26, 2013 in U.S. Appl. No. 11/742,423.
Request for Continued Examination and Amendment in U.S. Appl. No. 11/742,423, filed Jul. 5, 2013.
Notice of Allowance in U.S. Appl. No. 11/742,423 mailed on Aug. 13, 2013.
U.S. Appl. No. 11/742,455, filed Apr. 30, 2007.
Non-Final Office Action in U.S. Appl. No. 11/742,455 mailed on Mar. 22, 2010.
Response to Non-Final Office Action dated Mar. 22, 2010 in U.S. Appl. No. 11/742,455, filed Jun. 22, 2010.
Final Office Action in U.S. Appl. No. 11/742,455 mailed on Sep. 13, 2010.
Request for Continued Examination and Amendment in U.S. Appl. No. 11/742,455 mailed Feb. 23, 2011.
Non-Final Office Action in U.S. Appl. No. 11/742,455 mailed on Jan. 12, 2012.
Response to Non-Final Office Action dated Jan. 12, 2012 in U.S. Appl. No. 11/742,455, filed Apr. 12, 2012.
Notice of Allowance in U.S. Appl. No. 11/742,455 mailed on Apr. 27, 2012.
U.S. Appl. No. 13/469,003, filed May 10, 2012, entitled "Network Browser System, Method, and Computer Program Product for Scanning Data for Unwanted Content and Associated Unwanted Sites", Inventors, Paul Nicholas Gartside, et al.
Non-Final Office Action in U.S. Appl. No. 13/469,003 mailed on May 7, 2013.
Response to Non-Final Office Action dated May 7, 2013 in U.S. Appl. No. 13/469,003, filed Aug. 7, 2013.
Final Office Action in U.S. Appl. No. 13/469,003 mailed on Sep. 11, 2013.
U.S. Appl. No. 11/758,494, filed Jun. 5, 2007.
Non-Final Office Action in U.S. Appl. No. 11/758,494 mailed on Aug. 18, 2010.
Response to Non-Final Office Action in U.S. Appl. No. 11/758,494, filed Jan. 18, 2011.
Final Office Action in U.S. Appl. No. 11/758,494 mailed on Mar. 30, 2011.
Request for Continued Examination and Amendment in U.S. Appl. No. 11/758,494, filed Jun. 30, 2011.
Non-Final Office Action in U.S. Appl. No. 11/758,494 mailed on Dec. 22, 2011.
Response to Non-Final Office Action dated Dec. 22, 2011 in U.S. Appl. No. 11/758,494, filed Mar. 20, 2012.
Final Office Action in U.S. Appl. No. 11/758,494 mailed on May 2, 2012.
Request for Continued Examination and Amendment in U.S. Appl. No. 11/758,494, filed Jul. 2, 2012.
Non-Final Office Action in U.S. Appl. No. 11/758,494 mailed on Sep. 25, 2013.
"NoScript—Whitelist Javascript blocking for a safer Firefox experience!—features—InformAction", 3 pages, archive from May 26, 2005.
"NoScript—Whitelist JavaScript blocking for a safer Firefox experience!—what is it?—InformAction," 2 pages, Archive from May 26, 2005.
"NoScript—Whitelist JavaScript blocking for a safer Firefox experience!—screenshots—InformAction," 3 pages, ARchive from May 26, 2005.
"NoScript—Whitelist JavaScript blocking for a safer Firefox experience!—faq—InformAction," 6 pages, Archive from May 26, 2005.
"NoScript—Whitelist JavaScript blocking for a safer Firefox experience!—what is it?—InformAction," 3 pages, Archive from Apr. 9, 2006.
Berezovska, L., "Stephen Hawking: Time Travel Possible, But Only Forward," The Epoch Times, Jul. 7, 2010, 3 pages.
http://webarchive.org/web/*/http://noscript.net/features, 2 pages, printed Mar. 10, 2010.
U.S. Appl. No. 11/742,423, filed Apr. 30, 2007.
Non-Final Office Action in U.S. Appl. No. 11/742,423 mailed on May 12, 2009.

* cited by examiner

ELECTRONIC MESSAGE MANAGER SYSTEM, METHOD, AND COMPUTER PROGRAM PRODUCT FOR SCANNING AN ELECTRONIC MESSAGE FOR UNWANTED CONTENT AND ASSOCIATED UNWANTED SITES

CROSS-REFERENCE TO RELATED APPLICATION

This Application is a continuation (and claims the benefit of priority under 35 U.S.C. §120) of U.S. application Ser. No. 11/742,423 filed on Apr. 30, 2007, and entitled "ELECTRONIC MESSAGE MANAGER SYSTEM, METHOD, AND COMPUTER PROGRAM PRODUCT FOR SCANNING AN ELECTRONIC MESSAGE FOR UNWANTED CONTENT AND ASSOCIATED UNWATED SITES." The disclosure of the prior Application is considered part of and is incorporated by reference in the disclosure of this Application.

FIELD OF THE INVENTION

This application is also related to the following commonly owned patent applications, each incorporated hereby by reference in its entirety: U.S. patent application Ser. No. 11/742,423 filed Apr. 30, 2007 entitled "ELECTRONIC MESSAGE MANAGER SYSTEM, METHOD, AND COMPUTER PROGRAM PRODUCT FOR SCANNING AN ELECTRONIC MESSAGE FOR UNWANTED CONTENT AND ASSOCIATED UNWANTED SITES", now issued as U.S. Pat. No. 8,601,067; U.S. patent application Ser. No. 11/742,455 filed Apr. 30, 2007 entitled "NETWORK BROWSER SYSTEM, METHOD, AND COMPUTER PROGRAM PRODUCT FOR SCANNING DATA FOR UNWANTED CONTENT AND ASSOCIATED UNWANTED SITES", now issued as U.S. Pat. No. 8,196,206; U.S. patent application Ser. No. 11/758,494 filed Jun. 5, 2007 entitled "SYSTEM, METHOD, AND COMPUTER PROGRAM PRODUCT FOR MAKING A SCAN DECISION DURING COMMUNICATION OF DATA OVER A NETWORK"; and U.S. patent application Ser. No. 13/469,003 filed May 10, 2012 entitled "NETWORK BROWSER SYSTEM, METHOD, AND COMPUTER PROGRAM PRODUCT FOR SCANNING DATA FOR UNWANTED CONTENT AND ASSOCIATED UNWANTED SITES.

BACKGROUND

Unwanted data typically takes a variety forms. For example, "phishing" electronic messages and associated activity have become increasingly sophisticated, to the extent that many private computer users do not have the same level of protection at home as they do in the workplace. Such phishing attacks are becoming significantly more subtle, thus computer users are more likely to be hesitant when they receive an electronic message from a seemly trusted source (e.g. a bank, etc.).

There is thus a need for addressing these and/or other issues associated with the prior art.

SUMMARY

A system, method, and computer program product are provided for scanning an electronic message for unwanted content and associated unwanted sites in response to a request. In use, a request is received via a network to scan an electronic message prior to opening the electronic message, utilizing an electronic message manager. In addition, the electronic message is scanned for unwanted content and associated unwanted sites, in response to the request. Further, a response to the request is sent via the network.

DETAILED DESCRIPTION

Figure 1:
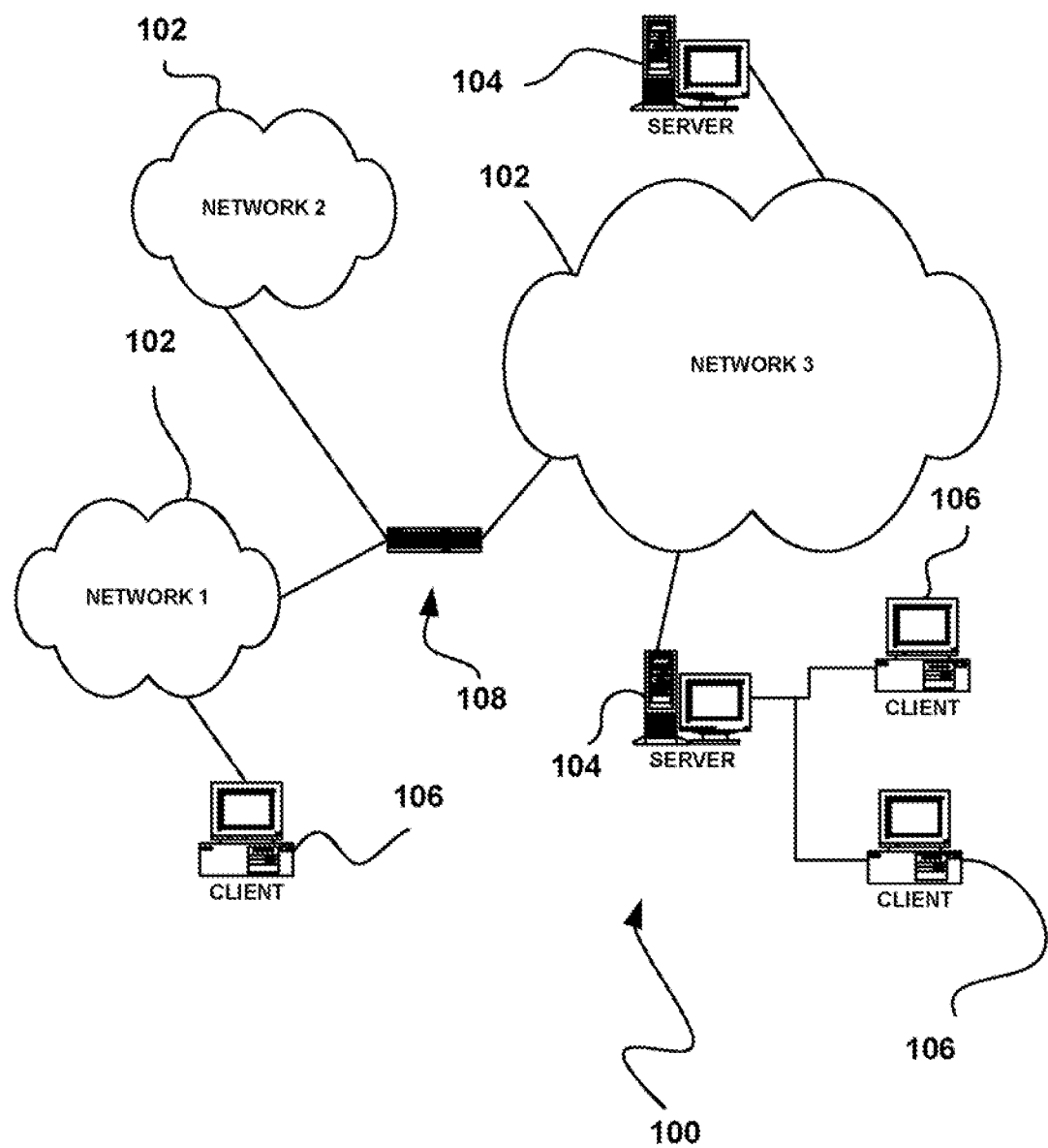
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
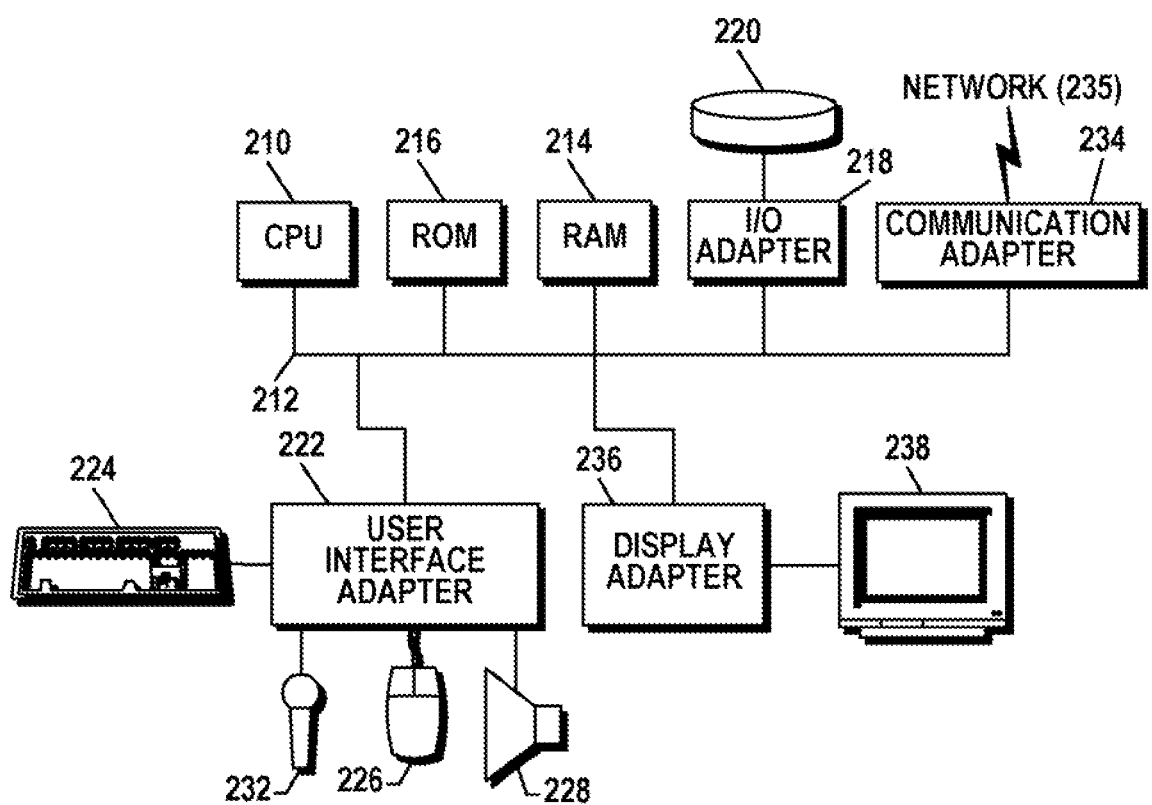
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, and I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238. For example, a non-transitory computer readable medium may include the RAM 214, the ROM 216, the disk storage units 220, etc.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
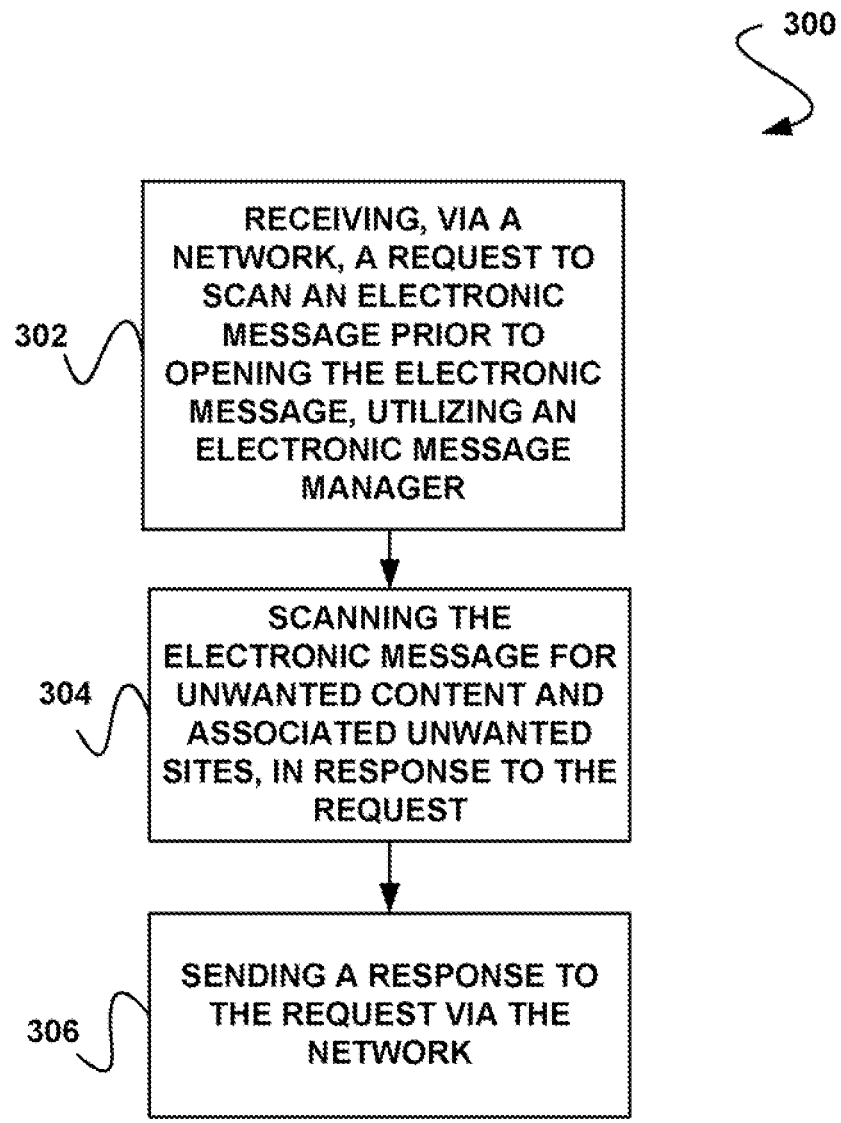
FIG. 3 shows a method for scanning an electronic message for unwanted content and associated unwanted sites in response to a request, in accordance with one embodiment.

FIG. 3 shows a method 300 for scanning an electronic message for unwanted content and associated unwanted sites in response to a request, in accordance with one embodiment. As an option, the method 300 may be carried out in the context of the architecture and environment of FIGS. 1 and/or 2. Of course, however, the method 300 may be carried out in any desired environment.

As shown in operation 302, a request to scan an electronic message is received via a network prior to opening the electronic message, utilizing an electronic message manager. In the context of the present description, the electronic message may include any message (or portion thereof) of electronic form capable of being opened utilizing an electronic message manager. For example, in various embodiments, the electronic message may include an electronic mail (email) message, instant messaging (IM) message, text message, bulletin board message, blog message, etc.

In addition, the electronic mail message manager may include any application (e.g. email application, etc.) capable of being utilized to open the electronic message. Still yet, the request may be generated utilizing the electronic message manager itself and/or an application program associated with the electronic message manager. For example, the application program may include a plug-in installed in association with the electronic message manager.

In various embodiments, the electronic message may optionally be downloaded to the electronic message manager of a client via the network, such that the request to scan such electronic message may be initiated at the client prior to opening the electronic message. In another embodiment, the electronic message may optionally be downloaded from a server-based electronic message manager, such that the request to scan such electronic message may be initiated at the server prior to opening (e.g. downloading, etc.) the electronic message.

Also in the context of the present description, the request may include any request to scan an electronic message that is received via the network. In addition, the network via which the request is received may include any desired network by which a request may be received. For example, the network may include any of the networks described with respect to FIG. 1.

Moreover, the request may be received by a server capable of receiving requests from a plurality of clients and further capable of responding to such requests. In various optional embodiments, the server may include any of the servers described with respect to FIGS. 1 and/or 2. In one embodiment, the server may include a backend server. In another embodiment, the server may be associated with various systems (e.g. intrusion detection systems, virus scanners, domain reputation systems, etc.).

In tone embodiment, the request may be generated automatically. For example, the request may be generated automatically in response to receipt of the electronic message by the electronic message manager. As another example, the request may be generated automatically if a preview pane of the electronic message manager is utilized. As yet another example, the request may be generated automatically in response to a user attempting to open the electronic message.

In another embodiment, the request may be generated in response to a user request. For instance, the request may be generated based on user input. As an option, such user input may be provided utilizing a mouse. Just by way of example, the user may point to the electronic message and depress the right mouse button to select a request option. Of course, it should be noted that the request may be generated in any desired manner. To this end, in the present embodiment, the user may select the electronic message for requesting the scan.

Further, in one embodiment, the request may include the electronic message. For example, the electronic message may accompany the request. In yet another embodiment, the request may include additional information associated with the electronic message. Such additional information may, in one embodiment, include header information.

For instance, such additional information may include a source of the electronic message. Optionally, the source of the electronic message may include a source address of the electronic message [e.g. email address, internet protocol (IP) address, etc.]. As another example, the additional information may include a history of the electronic message. Such history may include, as an option, a number of previous instances of the electronic message (e.g. a number of times the electronic message has been sent to users, etc.), etc.

In yet another example, the additional information may include a path by which the electronic message is communicated. For example, such path may include a series of nodes via which the electronic message is communicated from a source to a destination associated with the user. In still yet other examples, the additional information may include a behavior of the electronic message, a reputation of the electronic message, etc. Of course, the additional information may also include any other information capable of being associated with the electronic message.

As shown in operation 304, the electronic message is scanned for unwanted content and associated unwanted sites, in response to the request. In the context of the present description, the unwanted content may include any content (e.g. text, images, video, etc.) determined to be unwanted. For example, the unwanted content may include malware (e.g. spyware, adware, spam, rootkits, etc.).

Additionally, the unwanted sites may include any sites (e.g. web sites, etc.) determined to be unwanted. In various embodiments, the unwanted sites may include phishing sites, sites that include unwanted content, etc. Further, the unwanted sites may include sites incorporated in an electronic message or otherwise associated. As an option, the unwanted content and the unwanted sites may be predetermined. For example, the unwanted content and the associated unwanted sites may be included within a database (or a plurality of databases) utilized for storing different instances of predetermined unwanted content and associated unwanted sites.

Furthermore, the scan of the electronic message may include any desired analysis of the electronic message. In various embodiments, the electronic message may be scanned utilizing virus scanners, content scanners, etc. Also, in one embodiment, the electronic message may be scanned utilizing known data. For example, the electronic message may be scanned by performing a comparison of the electronic message with known data stored in a database of known data. As an option, the known data may include known clean data (e.g. data known to not include unwanted content and/or associated unwanted sites, etc.). As another option, the known data may include known unwanted data (e.g. data known to include unwanted content and/or associated unwanted sites, etc.).

In another embodiment, the electronic message may be scanned by performing an automated analysis of the electronic message and any information associated therewith. Optionally, such automated analysis may include a behavioral analysis For example, the analysis may include analyzing the additional information associated with the electronic message that may be included in the aforementioned request or otherwise obtained.

In yet another embodiment, the electronic message may be scanned by performing a manual analysis of the electronic message. For example, such manual analysis may be performed by a human opening the electronic message in a secure environment, identifying additional information associated with links within the opened electronic message, etc. Thus, an expert may manually determine whether the electronic message includes unwanted content and any associated unwanted sites.

Still yet, a response to the request is sent via the network, as shown in operation 306. Optionally, the response may be sent to the device utilized to initiate the request. Of course, however, the response may also be sent to any other desired computer. Just by way of example, the response may be sent to a reporting module that collects responses and information associated therewith, for reporting via a central interface, etc.

Moreover, the response may be sent in response to the abovementioned comparison of the electronic message to known data resulting in a match. As another option, the response may be sent in response to an indication by the automated analysis that the electronic message is clean (e.g. does not include unwanted content and associated unwanted sites) or unwanted (e.g. includes unwanted content and/or involves associated unwanted sites). As yet another option, the response may be sent in response to an indication by the manual analysis that the electronic message is clean.

In one embodiment, the response may prompt a display of a notification to the user. In another embodiment, the response may indicate that the electronic message does not include unwanted content and associated unwanted sites. For example, the response may indicate that the electronic message is safe for the user to open. In yet another embodiment, the response may indicate that the electronic message does include unwanted content, etc. To this end, the response may indicate that the electronic message is not safe for the user to open.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
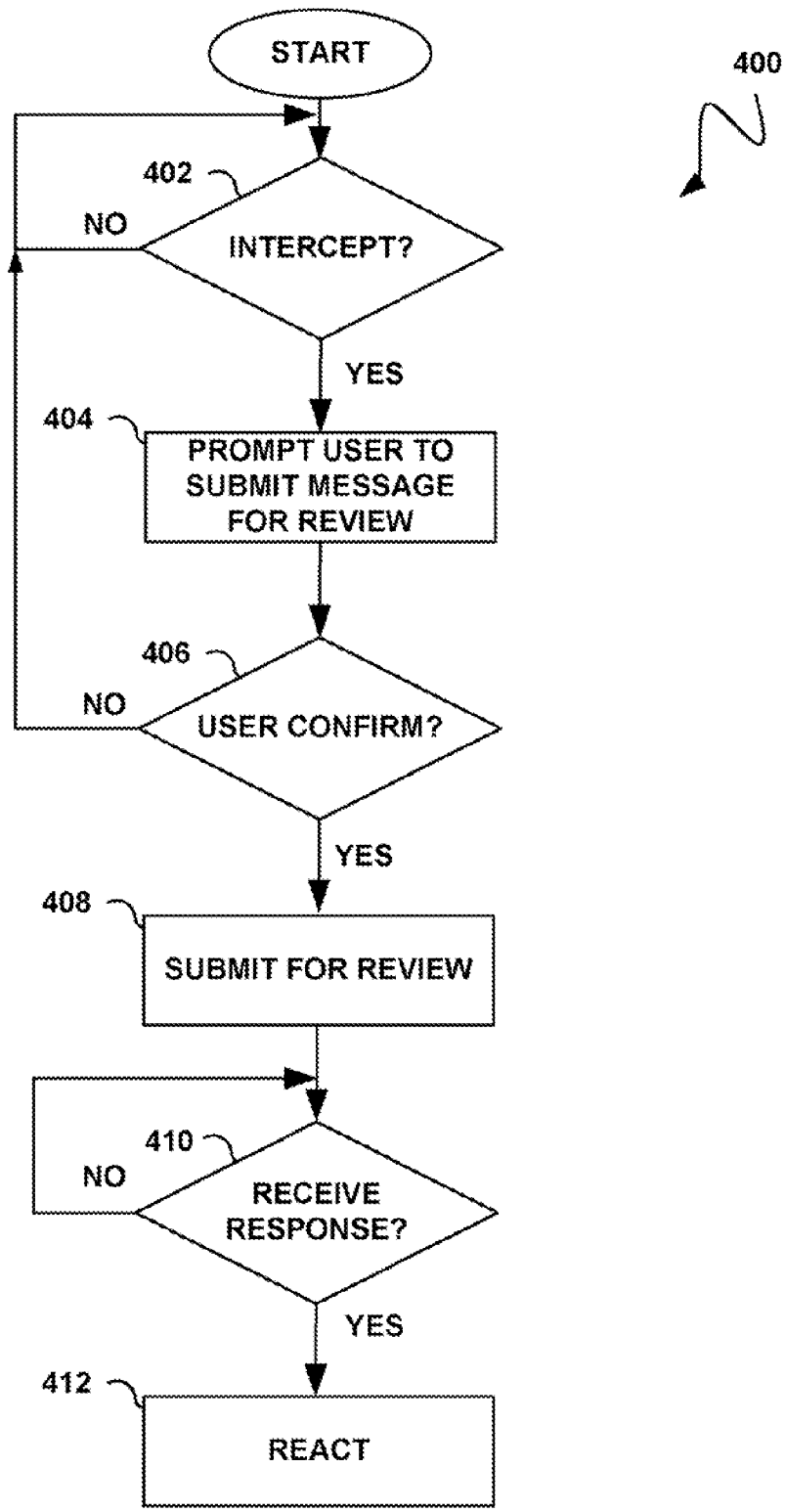
FIG. 4 shows a method for automatically initiating a request to scan an electronic message for unwanted content and associated unwanted sites, in accordance with another embodiment.

FIG. 4 shows a method 400 for automatically initiating a request to scan an electronic message for unwanted content and associated unwanted sites, in accordance with yet another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in operation 402, it is determined whether an electronic message has been intercepted. In one embodiment, the electronic message may be automatically intercepted. For example, the electronic message may be intercepted in response to a user request to open the electronic message. Of course, it should be noted that the electronic message may be intercepted in any desired manner.

In response to a determination that that the electronic message has been intercepted, a user is prompted to submit the electronic message (or portion thereof) for review. Note operation 404. For example, the notification may be displayed to the user via a client utilized by the user. In one embodiment, the notification may include a pop-up window, for example.

As another option, the notification may be displayed to the user utilizing an electronic message manager associated with the electronic message. Thus, the user request to open the electronic message may be at least temporarily prevented, such that the user may be prompted to submit the electronic message for review prior to opening the same.

Furthermore, it is determined whether the user confirms submission of the electronic message for review, as shown in decision 406. For example, the user may confirm submission of the electronic message by selecting an option (e.g. submit, do not submit, etc.) via the prompt to submit the electronic message. Of course, however, the user may confirm submission of the electronic message for review in any desired manner.

If it is determined that the user does not confirm submission of the electronic message for review, the electronic message may be opened (not shown). In one embodiment, the electronic message may be automatically opened (e.g. in response to the user closing a window displaying the prompt, after a predetermined period of time, etc.). In another embodiment, the electronic message may be manually opened. For example, the user may re-select electronic message to open the same.

If it is determined that the user confirms submission of the electronic message for review, the electronic message may be submitted for review, as shown in operation 408. In one embodiment, submitting the electronic message may include transmitting the electronic message to a server utilizing a network. As mentioned earlier, such server may be capable of scanning the electronic message for unwanted content and associated unwanted sites. More information regarding such server-rated functionality will be set forth in greater detail during the description of subsequent figures.

As also shown, it is determined whether a response to the submission of the electronic message is received. See decision 410. In the context of the present embodiment, the response may include information associated with a scan of the electronic message for unwanted content and associated unwanted sites.

It should be noted that the response may be received in any desired manner. For example, in one embodiment, the response may be received via a pop-up window. In another embodiment, the response may be received utilizing an electronic message manager via which the electronic message was submitted.

Optionally, the response may be required to be received within a predetermined time period after die request is sent in operation 408. For example, the server may be required to send the response within the predetermined time period. The predetermined time period may be configured (e.g. by an administrator, etc.) as desired. As another option, a lightweight messaging protocol may be utilized for transmitting the response, thus facilitating efficient communication thereof.

In one embodiment, a notification may be sent prior to sending the response. For example, the notification may be sent in response to the submission of the electronic message. Such notification may optionally provide information to the user including, for example, a notice to refrain from opening the electronic message until the response is received, a notice as to an estimated wait for the response, etc.

Upon receipt of the response per decision 410, a reaction is performed, as shown in operation 412. In one embodiment, such reaction may be manual. For example, the response may indicate a suggested action for the user to perform with respect to the electronic message. Such suggested action may include not opening the electronic message, deleting the electronic message, etc.

In another embodiment, the reaction may be automatic. For example, the electronic message manager and/or an accompany application program (e.g. virus scanner, intrusion detection system, etc.) may be utilized to react to the electronic message. For example, such reaction may include remediation, cleaning the electronic message, blocking the electronic message from being opened, quarantining the electronic message, etc.

In yet another embodiment, the reaction may include reporting information associated with the electronic message. In this way, the electronic message may be subjected to further analysis. In still yet another embodiment, such reported information may be stored in a database. Of course, it should be noted that any desired reaction may be performed.

Figure 5:
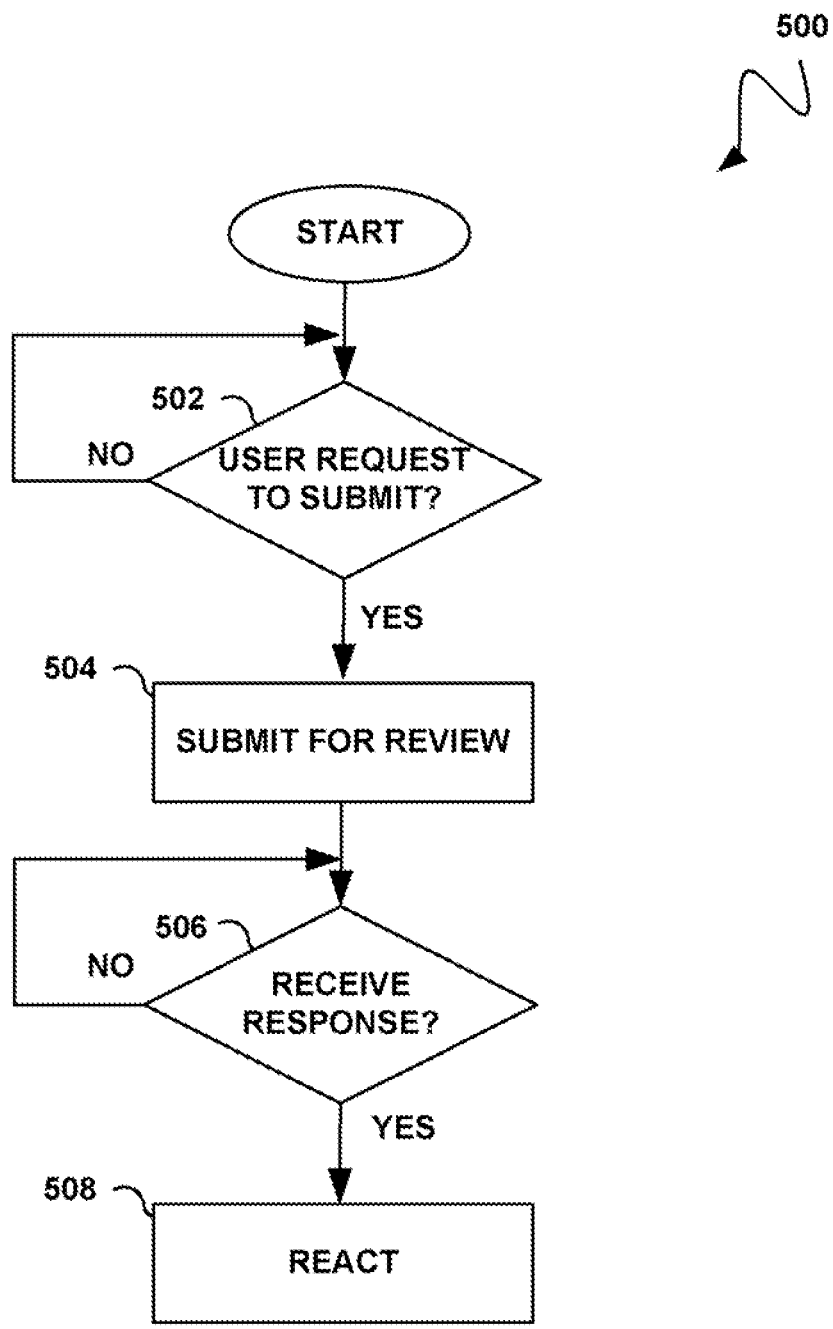
FIG. 5 shows a method for manually initiating a request to scan an electronic message for unwanted content and associated unwanted sites, in accordance with still yet another embodiment.

FIG. 5 shows a method 500 for manually initiating a request to scan an electronic message for unwanted content and associated unwanted sites, in accordance with still yet another embodiment. As an option, the method 500 may be carried out in the context of the architecture and environment of FIGS. 1-4. Of course, however, the method 500 may be carried out in any desired environment. It should also be noted that the aforementioned definitions may apply during the present description.

As shown in decision 502, it is determined whether a user requests to submit an electronic message. In one embodiment, the user may request to submit the electronic message utilizing an electronic message manager via which the electronic message is available to be opened. Just by way of example, the user may right click the electronic message utilizing a mouse, as set forth earlier.

At this point, the method 500 proceeds in a manner similar to the operations 408-412 of FIG. 4. Specifically, in response to the user request to submit the electronic message, such electronic message is submitted for review, as shown in operation 504. Thereafter, it is determined whether a response to the user request is received, as shown in decision 506. Still yet, a reaction is performed, as shown in operation 508.

Figure 6:
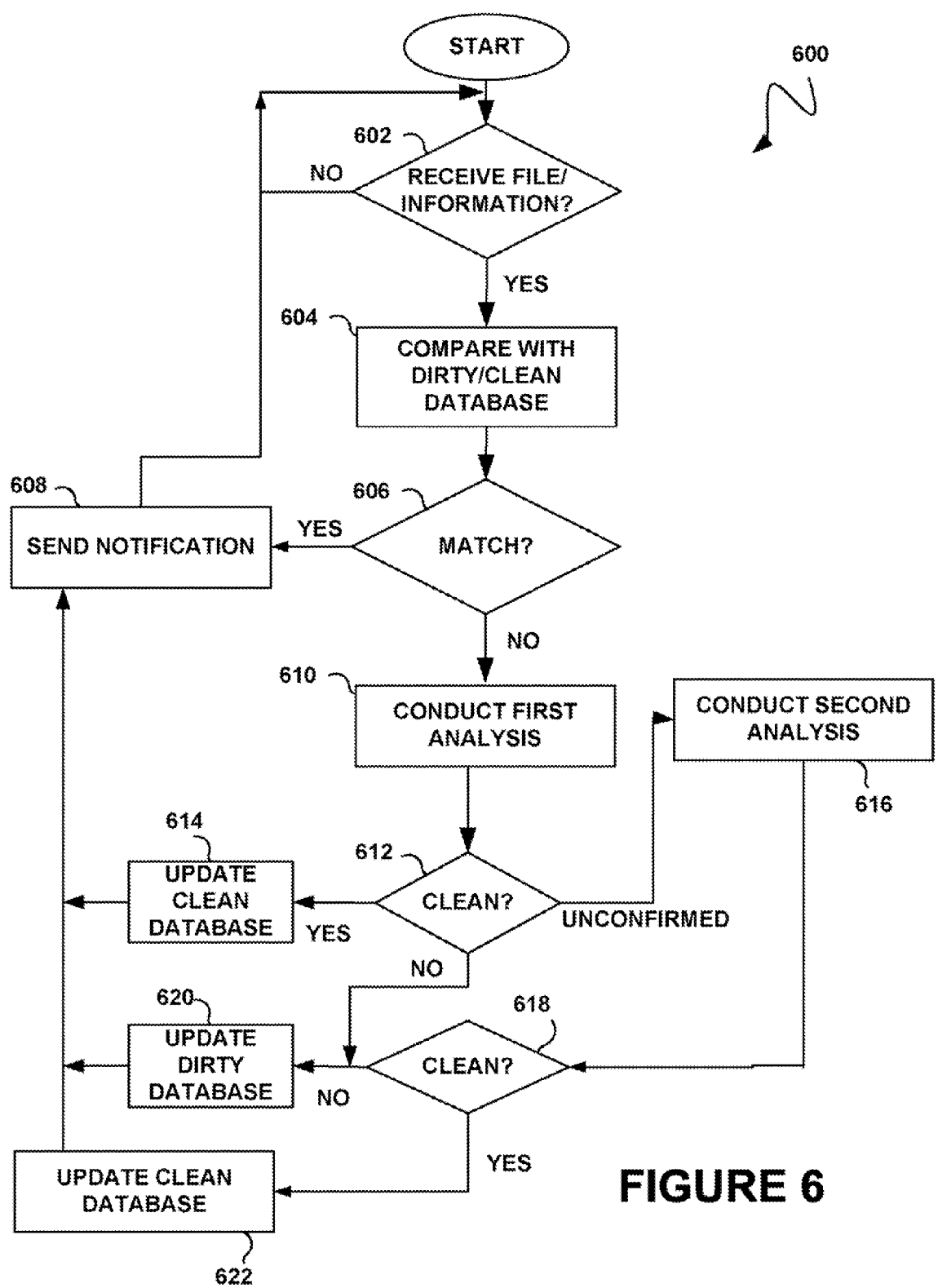
FIG. 6 shows a method for determining a response to a request to scan an electronic message for unwanted content and associated unwanted sites, in accordance with another embodiment.

FIG. 6 shows a method 600 for determining a response to a request to scan an electronic message for unwanted content and associated unwanted sites, in accordance with another embodiment. As an option, the method 600 may be carried out in the context of the architecture and environment of FIGS. 1-5. For example, the method 600 of FIG. 6 may be carried out in response to the submissions of the operation 405 of FIG. 4 and/or the operation 504 of FIG. 5. Of course, however, the method 600 may be carried out in any desired environment. It should also be noted that the aforementioned definitions may apply during the present description.

As shown in decision 602, it is determined whether an electronic message and associated information (as an option) has been received. For example, such electronic message and associated information may be received at one or more servers where analysis is to take place. To this end, the server may be capable of receiving electronic messages and associated information from any desired number of different computers. Thus, as an option, a plurality of computers may be in communication with the server via a network, and may be capable of submitting electronic messages and associated information for scanning by the server.

In response to a determination that the electronic message and associated information have been received, the electronic message is compared with known data in a dirty database and/or a clean database. Note operation 604. The dirty database and/or the clean database may include any data structure capable of storing known data. Optionally, the dirty database and/or the clean database may include known data in the form of message digest 5 (MD5) objects to accelerate the comparison. In such embodiment, such MD5 hashing may be performed at a component level (e.g. on an attachment, embedded object, etc.), since a sum of an entire electronic message is unlikely to ever be the same for two identical messages received at different times, due to variances in header information, etc.

In one embodiment, die known data may include any data predetermined to be clean or unwanted, such that known dean data may be stored in the dean database and/or known unwanted data may be stored in the dirty database. In various embodiments, the known data may be identified utilizing the present system and/or any system capable of identifying known clean and/or unwanted data.

Just by way of example, the known data may be identified utilizing a domain reputation system. For instance, the known data may be identified utilizing the McAfee® SiteAdvisor™ system. As another example, the known data may be identified utilizing other security applications (e.g. virus scanner, firewall, anti-spam application, intrusion detection system, etc.) installed at different locations (e.g. on different gateways, computers, etc.). In this way, the clean database and/or dirty database may be populated with known data utilizing a community of different systems.

It is further determined whether there is at least one match between the electronic message and any of the known data, as shown in decision 606. If it is determined that a match has been identified, a notification is sent to the computer from which the electronic message and associated information was received. Note operation 608. The notification may include any information capable of notifying a user of the client that the electronic message is respectively clean or unwanted.

For example, if a match between the electronic message and an instance of known data within the clean database is identified, the notification may identify the electronic message as clean. If, however, a match between the electronic message and an instance of known data within the dirty database is identified, the notification may identify the electronic message as being unwanted. Of course, it should be noted that the notification may also include any other desired information, and further be used to prompt any desired reaction.

If it is determined that a match between the electronic message and any of the known data has not been identified, a first analysis is conducted. See operation 610. In the context of the present description, the first analysis may include any analysis that is different from the comparison of operation 604. In one embodiment, the first analysis may include an automatic analysis. Such automatic analysis may include scanning the electronic message for unwanted content and associated unwanted sites, for example, utilizing antivirus scanners, anti-spam scanners, etc.

As another option, the automatic analysis may include a behavior analysis. The behavior analysis may utilize the information associated with the electronic message that was received by the server, for example. In various embodiments, the information may include header information (e.g. a history of the electronic message, a source of the electronic message, a path of communication associated with the electronic message, etc.), a reputation of the electronic message, and/or any other information associated with the electronic message. In the case of header information, such information may be analyzed to determine, if possible, whether it was spoofed, etc., thus indicating that the electronic message is not clean. In use, the information used in operation 610 may be collected, generated, etc. by the server in real time or in any other desired manner.

Based on the first analysis, it is determined whether the electronic message is clean, as shown in decision 612. If it is determined that the electronic message is clean, the clean database is updated with the electronic message. Note operation 614. In various embodiments, updating the clean database with the electronic message may include updating the clean database with the contents of the electronic message or a hash thereof, etc. As an option, a format of the electronic message may not necessarily be reflected or considered when updating the database. After or in parallel with the database update, a notification of the electronic message being clean is sent to the requesting computer. See operation 608.

If it is determined that the electronic message is not dean based on the first analysis of operation 610, the dirty database is updated with the electronic message. Note operation 620. As also shown, a notification of the electronic message being unwanted is sent to the requesting computer. If, however, it is unconfirmed whether the electronic message is clean based on the first analysis, a second analysis is conducted, as shown in operation 616.

In the context of the present description, the second analysis may include any analysis that is different than the first analysis (see operation 610) and the comparison of the electronic message with the dirty database and/or the clean database (see operation 604). In one embodiment, the second analysis may include a manual analysis. For example, the electronic message may be manually downloaded to a secure area (e.g. virtual machine, etc.) for determining whether the electronic message includes any unwanted data and associated unwanted sites.

Optionally, in response to initiation of the second analysis, a delay notification may be sent to the requesting computer (not shown). The delay notification may be utilized for informing the requesting computer of a possible delay in receiving a response to the originating request. Further, the notification may indicate a time period in which the requesting computer may expect to receive the response. For example, such time period may be based on a number of electronic messages being analyzed utilizing the second analysis (i.e. a current load), etc.

Next, it is once again determined whether the electronic message is clean, based on the second analysis. Note decision 618. For example, the second analysis may include a manually generated indication identifying the electronic message as clean or unwanted. If it is determined that the electronic message is clean, the dean database is updated with the electronic message, as shown in operation 622 (which is similar to operation 614). If, however, it is determined that the file is unwanted based on the second analysis, the dirty database is updated with the electronic message. Again, see operation 620. In this way, updates to the database may be utilized during subsequent scans of electronic messages transmitted to the server, thus allowing the server to avoid redundant processing of such electronic messages.

To this end, the server may be utilized for scanning electronic messages transmitted by requesting computers. It should be noted that, while a first and second analysis have been described herein, any desired number of different types of analysis may be utilized. For example, each analysis may optionally be associated with a different system, etc.

Figure 7:
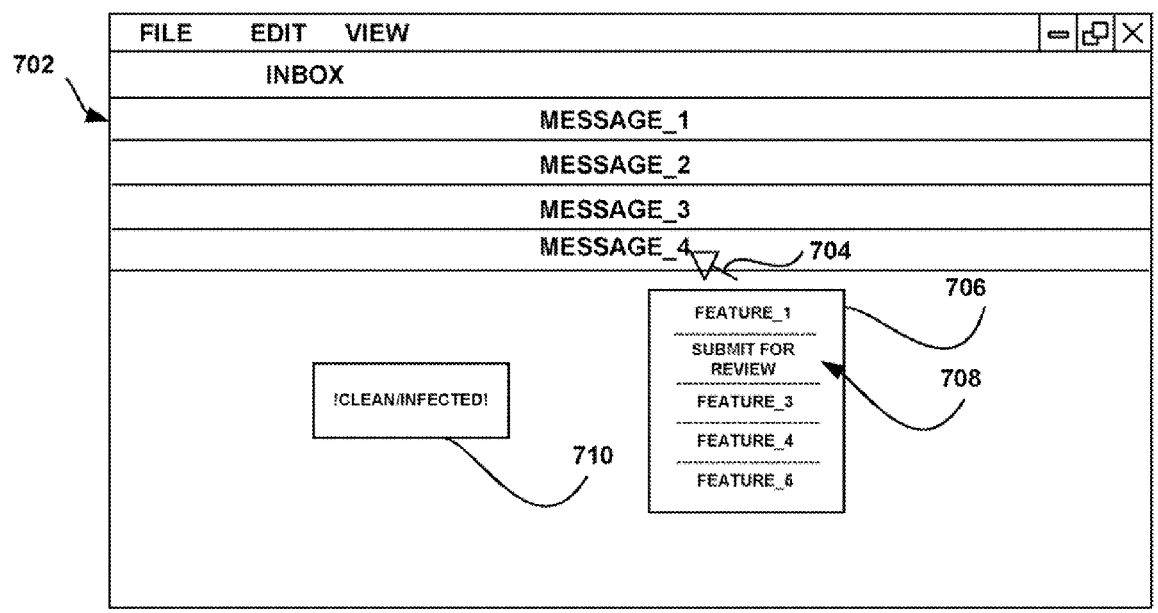
FIG. 7 shows a graphical user interface (GUI) for receiving a request from a user to scan an electronic message for unwanted content and associated unwanted sites, in accordance with yet another embodiment.

FIG. 7 shows a graphical user interface (GUI) 700 for receiving a request from a user to scan an electronic message for unwanted content and associated unwanted sites, in accordance with yet another embodiment. As an option, the GUT 700 may be implemented in the context of the architecture and environment of FIGS. 1-6. For example, the GUI 700 may be used to carry out the method 500 of FIG. 5. Of course, however, the GUI 700 may be implemented in any desired environment. It should also be noted that the aforementioned definitions may apply during the present description.

As shown, the GUI 700 includes an electronic message manager 702 for allowing a user to initiate a request for an electronic message to be scanned prior to opening the same. As also shown, a user may submit the request by pointing to a cursor 704 at an electronic message and clicking a mouse button. For example, the clicking may include clicking a right mouse button.

In response to the click of the mouse button, a menu 706 is displayed. The menu may include a plurality of options (e.g. feature_1 to feature_5, as shown). One of such options may include an option 708 to submit the electronic message for review. Thus, the user may thus select such option 708.

In response to the selection by the user to submit the electronic message for review, the electronic message (or portion thereof) is transmitted to a server for scanning. Based on the scanning, the server identifies the electronic message as clean or utwanted. Further, a response 710 to the user request is received for indicating the identification of the electronic message as clean or unwanted, as shown. As also shown, the response 710 may include a pop-up window displayed via the electronic message manager 702.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    receiving, via a network, a request to scan an electronic message prior to opening the electronic message, the request including at least a portion of the electronic message and information associated with the electronic message, wherein the information includes an indication of a number of times an instance of the electronic message has been previously sent to users;
    analyzing the received portion of the electronic message and the received information associated with the electronic message to determine whether the electronic message includes unwanted content; and
    sending a response to the request to a client via the network, wherein the response indicates whether the electronic message is determined to include unwanted content.

2. The method of claim 1, wherein the electronic message is analyzed by performing a comparison of the electronic message with known data stored in a database.

3. The method of claim 2, wherein the known data includes at least one of known clean data and known unwanted data.

4. The method of claim 2, wherein the database of known data is updated based on the analyzing.

5. The method of claim 1, wherein the response prompts a display of a notification to a user.

6. The method of claim 1, wherein the request to scan the electronic message is sent by a user in response to a determination that the electronic message has been intercepted.

7. The method of claim 1, wherein the information associated with the electronic message further includes at least one of a source of the electronic message, a path by which the electronic message is communicated, a behavior of the electronic message, and a reputation associated with the electronic message.

8. A non-transitory computer-readable medium comprising one or more instructions that when executed on a processor configure the processor to:
receive, via a network, a request to scan an electronic message prior to opening the electronic message, the request including at least a portion of the electronic message and information associated with the electronic message, wherein the information includes an indication of a number of times an instance of the electronic message has been previously sent to users;
analyze the received portion of the electronic message and the received information associated with the electronic message to determine whether the electronic message includes unwanted content; and
send a response to the request to a client via the network, wherein the response indicates whether the electronic message is determined to include unwanted content.

9. The non-transitory computer-readable medium of claim 8, wherein the request is generated by a plug-in installed at the client.

10. The non-transitory computer-readable medium of claim 8, wherein the request is generated automatically in response to a user attempting to open the electronic message.

11. The non-transitory computer-readable medium of claim 8, wherein the electronic message is analyzed by performing a comparison of the electronic message with known data stored in a database.

12. The non-transitory computer-readable medium of claim 11, wherein the known data includes at least one of known clean data and known unwanted data.

13. The non-transitory computer-readable medium of claim 11, wherein the response is sent in response to the comparison resulting in a match.

14. The non-transitory computer-readable medium of claim 11, wherein the response is sent in response to the analysis indicating that the electronic message is clean.

15. The non-transitory computer-readable medium of claim 11, wherein the database of known data is updated based on the analyzing.

16. The non-transitory computer-readable medium of claim 8, wherein the response prompts a display of a notification to a user.

17. The non-transitory computer-readable medium of claim 8, wherein the unwanted content includes malware.

18. The non-transitory computer-readable medium of claim 8, wherein the unwanted content includes at least one unwanted site.

19. The non-transitory computer-readable medium of claim 18, wherein the at least one site includes at least one of a phishing site and a site including unwanted content.

20. The non-transitory computer-readable medium of claim 8, wherein the request is generated by a preview pane of an electronic message manager.

21. The non-transitory computer-readable medium of claim 8, wherein the electronic message is downloaded to an electronic message manager, and the request to scan the electronic message is initiated at a client after downloading the electronic message and prior to opening the downloaded electronic message.

22. The non-transitory computer-readable medium of claim 8, wherein the request to scan the electronic message is sent by a user in response to a determination that the electronic message has been intercepted.

23. The non-transitory computer-readable medium of claim 8, wherein the information associated with the electronic message further includes at least one of a source of the electronic message, a path by which the electronic message is communicated, a behavior of the electronic message, and a reputation associated with the electronic message.

24. A system, comprising:
an application program installed on a client for transmitting, via a network, a request to scan an electronic message prior to opening the electronic message, the request including at least a portion of the electronic message and information associated with the electronic message, wherein the information includes an indication of a number of times an instance of the electronic message has been previously sent to users;
a server device in communication with the client via the network for receiving the request, analyzing the received portion of the electronic message and the received information associated with the electronic message to determine whether the electronic message includes unwanted content, and sending a response to the request to the client via the network, wherein the response indicates whether the electronic message is determined to include unwanted content.

25. The system of claim 23, wherein the server device stores results of scanning electronic messages transmitted by a plurality of clients in a database, and the analyzing utilizes the database.

* * * * *